US008180748B2

(12) United States Patent
Farmer

(10) Patent No.: US 8,180,748 B2
(45) Date of Patent: *May 15, 2012

(54) SURROGATE KEY GENERATION AND UTILIZATION

(75) Inventor: Donald M. Farmer, Woodinville, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/876,010

(22) Filed: Sep. 3, 2010

(65) Prior Publication Data

US 2010/0332463 A1 Dec. 30, 2010

Related U.S. Application Data

(63) Continuation of application No. 11/286,623, filed on Nov. 23, 2005, now Pat. No. 7,801,844.

(51) Int. Cl.
G06F 7/00 (2006.01)
G06F 17/00 (2006.01)
(52) U.S. Cl. ......... 707/704; 707/600; 707/602; 707/604
(58) Field of Classification Search ................ None
See application file for complete search history.

(56) References Cited

U.S. PATENT DOCUMENTS

| 5,499,371 | A | 3/1996 | Henninger |
|---|---|---|---|
| 6,591,272 | B1 | 7/2003 | Williams |
| 7,275,024 | B2 | 9/2007 | Yeh |
| 7,308,460 | B2 | 12/2007 | Venkatesh |
| 7,516,439 | B2 | 4/2009 | Robinson |
| 7,653,652 | B2 | 1/2010 | Kagalwala |
| 7,739,223 | B2 | 6/2010 | Vaschillo |
| 2003/0055832 | A1 | 3/2003 | Roccaforte |
| 2004/0123048 | A1 | 6/2004 | Mullins |
| 2004/0215626 | A1 | 10/2004 | Colossi |
| 2005/0065910 | A1 | 3/2005 | Welton |
| 2005/0177589 | A1 | 8/2005 | Venkatesh |
| 2006/0031250 | A1 | 2/2006 | Henigman |
| 2008/0104032 | A1 | 5/2008 | Sarkar |

OTHER PUBLICATIONS

Oracle Technology Network Discussion Forums. Thread: retrieved the sequence number which deleted and committed. Http://forums.oracle.com/forums/thread.jspa?forumID=75&messageID=702937&threadID=243785. Last accessed Nov. 15, 2006.
Peter Gulutzan.DBAzine.com: Sequences and Identity Columns. Http://www.dbazine.com/db2/db2-disarticles/gulutzan4. Last Accessed Nov. 15, 2006.
Haan, Roy: Key Points About Surrogate Keys; Rational Commerce Limited, 2002, 2003; pp. 1-8 Retrieved on Jan. 17, 2008.
Meyer, Gary: How Surrogate Primary Key Generation Affects Concurrency and the Cache Hit Ratio; Last Revised Aug. 21, 1998; SQL Server; Sybase Inc. Retrieved on Jan. 17, 2008.
U.S. Appl. No. 11/286,623, Jan. 29, 2008, Office Action.
U.S. Appl. No. 11/286,623, Jul. 30, 2008, Office Action.
U.S. Appl. No. 11/286,623, Apr. 7, 2009, Office Action. U.S. Appl. No. 11/286,623, Jun. 10, 2010, Office Action.
U.S. Appl. No. 11/286,623, Jul. 9, 2010, Notice of Allowance.

*Primary Examiner* — Ann Chempakaseril
(74) *Attorney, Agent, or Firm* — Workman Nydegger

(57) ABSTRACT

The subject disclosure pertains to databases as well as generation and utilization of keys. A desired or default number of values can be requested from a domain and allocated for use. These values can be utilized to generate surrogate keys. Subsequently or concurrently, the keys can be employed with respect to operations such as single pass loading of databases and/or data warehouses. Any unused keys can be returned and made available for use by other users or processes. Furthermore, the key generation functionality can be provided outside a database thereby relieving a database system of this burden.

10 Claims, 13 Drawing Sheets

SURROGATE KEY GENERATION AND UTILIZATION

CROSS-REFERENCE TO RELATED APPLICATIONS

This application is a continuation of U.S. patent application Ser. No. 11/286,623, filed Nov. 23, 2005. The foregoing patent application is incorporated herein by reference in its entirety.

BACKGROUND OF THE INVENTION

A data warehouse is a nonvolatile repository that houses an enormous amount of historical data rather than live or current data. The historical data can correspond to past transactional or operational information. Data warehousing and associated processing mechanisms (e.g., On-Line Analytical Processing (OLAP), Relational OLAP (ROLAP), Multidimensional OLAP (MOLAP), and Hybrid OLAP (HOLAP)) are widespread technologies employed to support business decisions and data analysis. Data warehouses are populated at regular intervals with data from one or more heterogeneous data sources, for example from multiple transactional or enterprise resource planning (ERP) systems. This aggregation of data provides a consolidated view of an organization from which valuable information can be derived. Though the sheer volume can be overwhelming, the organization of data can help ensure timely retrieval of useful information. For example, the organization of data in a data warehouse typically involves creation and employment of fact and dimension tables.

Standard data warehouse design methods require dimensions to include a surrogate key to join a dimension table with a fact table. A surrogate key is a deliberately meaningless, single part, unique identifier. There is no semantic value associated with the key rather its sole purpose is unique identification. The surrogate key is automatically generated by a database system upon inserting or loading a row in a dimension table, for example.

A conventional solution for generating these unique keys involves the use of auto-incrementing columns in the database or data warehouse. More specifically, the database or data warehouse designer defines an increment value for the column. When a new record is inserted into a table, the database stores a new value in the auto-incrementing column, which is greater than the previous row by the increment value and therefore guaranteed to be unique.

One of the problems of data warehouse development is that sometimes the surrogate key for a row needs to be known in advance in order to utilize that key in another operation. For example, if a document was received from a mainframe computer it might include information like a sales record and that sales record will typically include customer, product and transaction information. Furthermore, these rows can be very large including hundreds of columns. When this information is taken from a traditional system like a mainframe and loaded into a relational database system or some data warehouse system, typically the record will be spilt up into multiple tables such customer, product and order tables. Often a join needs to be executed on these tables together and the surrogate keys enable this to be done. However, in order to do this in a single process, the keys need to be known in advance, because the key values need to be inserted into the tables.

Many users try attempt to tackle this problem by inserting a key and immediately querying the table for the last key entered or the maximum value of the auto-incremented column. However, there are several problems with this approach.

First, the isolation of the database transaction may mean that the key value is not available until after the record is committed to the table. This requires the user to ensure that the current process is completed before they can use the new key value, which restricts their possibilities of using the new key to operations to be performed within the scope of the current transaction.

In addition, where many values are being inserted by parallel processes, it is not guaranteed that returning the last key generated will return the key for the expected record. For example, Process A may insert Record 1 and request the last key generated. However, between the insert and the request, Process B has inserted Record 2. Hence, the database returns the key for Record 2, which is not what Process A expects.

BRIEF SUMMARY OF THE INVENTION

The following presents a simplified summary in order to provide a basic understanding of some aspects of the claimed subject matter. This summary is not an extensive overview. It is not intended to identify key/critical elements or to delineate the scope of the claimed subject matter. Its sole purpose is to present some concepts in a simplified form as a prelude to the more detailed description that is presented later.

Briefly described the subject innovation pertains to database keys and more particularly toward generation and utilization of surrogate keys. Systems and methods are provided that enable keys to be provided in advance, prior to entering a record in a database, for instance. As a result, a database or data warehouse can be populated with multiple items simultaneously via a single pass operation, among other things. In addition, the subject systems and methods can support parallel processes and efficient use of a domain without stressing a database.

In accordance with an aspect of the subject innovation, a domain component is provided which supplies information about the state of a domain. The domain can include a plurality of unique values such as integers. The information can pertain to sequences of values such as the start or seed value, the increment value and the size of the sequence, among other things.

According to another aspect of the innovation, systems and methods are provided to set up domain components. For example, domain components can correspond to a database object such as a table. In such an instance, a domain component can be generated by identifying and/or generating a database and a table and populating the table with appropriated data.

According to another aspect of the innovation, a key component is provided that generates keys based on information provided by the domain component. For example, the key component can request a default or custom amount of values be allocated to the component for key generation. The key component can subsequently or concurrently obtain a seed value as well as other information concerning a sequence and generate keys based thereon.

In accordance with an aspect of the subject innovation, a key component is provided that can generate keys outside the database. The key component can be a service that generates keys and provides them to the database for use thus relieving the database of this burden and providing the ability to obtain keys in advance.

According to still another aspect of the subject innovation, values initially allocated to a component or process can be returned. If the number of values allocated to a component exceeds the amount of values actually utilized, for example for key generation, then the unused values can be returned to the domain component and made available for use by other components or processes.

In accordance yet another aspect of the claimed subject matter, locks can be employed or acquired between key component and domain component transactions. The locks enable a myriad of clients to interact with the domain component while also providing transactional isolation.

To the accomplishment of the foregoing and related ends, certain illustrative aspects of the claimed subject matter are described herein in connection with the following description and the annexed drawings. These aspects are indicative of various ways in which the subject matter may be practiced, all of which are intended to be within the scope of the claimed subject matter. Other advantages and novel features may become apparent from the following detailed description when considered in conjunction with the drawings.

DETAILED DESCRIPTION OF THE PREFERRED EMBODIMENTS

The various aspects of the subject innovation are now described with reference to the annexed drawings, wherein like numerals refer to like or corresponding elements throughout. It should be understood, however, that the drawings and detailed description relating thereto are not intended to limit the claimed subject matter to the particular form disclosed. Rather, the intention is to cover all modifications, equivalents, and alternatives falling within the spirit and scope of the claimed subject matter.

As used in this application, the terms "component" and "system" and the like are intended to refer to a computer-related entity, either hardware, a combination of hardware and software, software, or software in execution. For example, a component may be, but is not limited to being, a process running on a processor, a processor, an object, an instance, an executable, a thread of execution, a program, and/or a computer. By way of illustration, both an application running on a computer and the computer can be a component. One or more components may reside within a process and/or thread of execution and a component may be localized on one computer and/or distributed between two or more computers.

The word "exemplary" is used herein to mean serving as an example, instance, or illustration. Any aspect or design described herein as "exemplary" is not necessarily to be construed as preferred or advantageous over other aspects or designs.

Furthermore, all or portions of the subject innovation may be implemented as a method, apparatus, or article of manufacture using standard programming and/or engineering techniques to produce software, firmware, hardware, or any combination thereof to control a computer to implement the disclosed innovation. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of the claimed subject matter.

Figure 1:
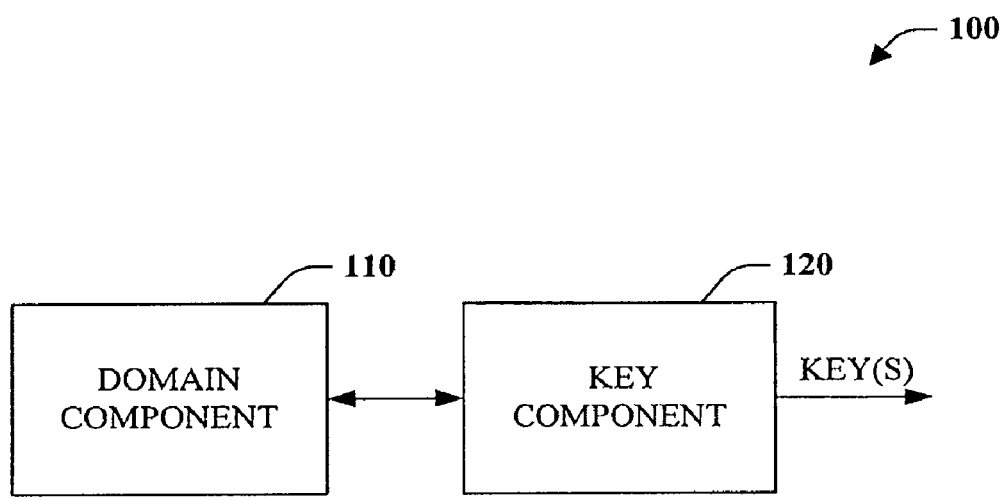
FIG. 1 is a block diagram of key production system.

Turning initially to FIG. 1, a key production system 100 is depicted in accordance with an aspect of the subject innovation. The system 100 includes a domain component 110 and a key component 120. The domain component 110 provides information pertaining to a finite number of unique values. The values can be but are not limited to numbers such as integers (e.g., 16-bit, 32-bit, 64-bit . . . ). The state of a domain can be tracked and provided for receipt or retrieval by domain component 110. Hence, a specific quantity of values requested by a component can be documented by the domain component 110 as used and unavailable. In accordance with an aspect of the claimed subject matter, the domain component 110 can be a database object such as but not limited to a table. Key component 120 generates a key such as a surrogate key based on information about available values from the domain component 110. By way of example and not limitation, the key component 120 can receive, retrieve or otherwise obtain, from the domain component 110, a starting value or seed and generate a plurality of keys by setting a current value to the value of the seed and incrementing the current value to generate new keys.

Figure 2:
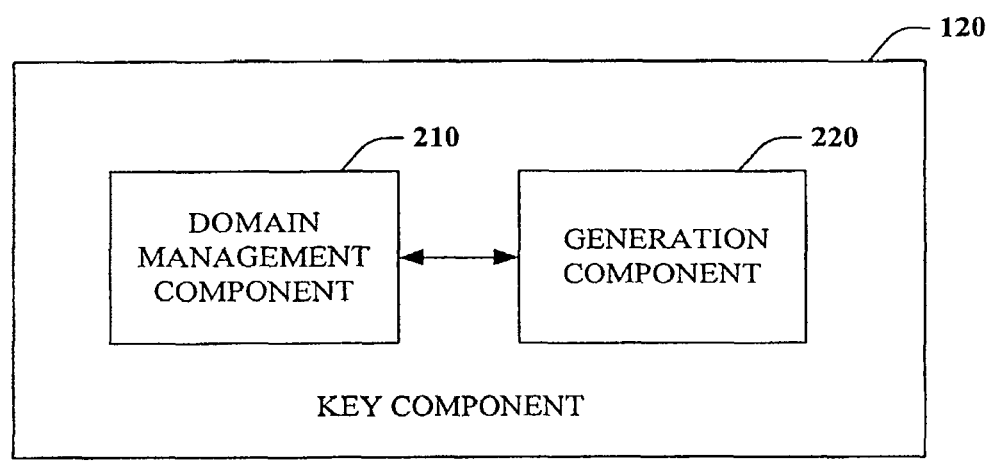
FIG. 2 is a block diagram of a key component.

FIG. 2 illustrates a key component 120 in further detail in accordance with an aspect of the subject innovation. The key component 120 includes a domain management component 210 communicatively coupled to a generation component 220. Generation component 220 can request a group or cache of values to be used as keys. This group can be of any number of values, although a default quantity can also be utilized. The domain management component 210 can communicate with the domain component 110 (FIG. 1) and request a number of values be designated for use. The domain management component 210 can also retrieve or receive a start value or seed and optionally other data such as but not limited to increment and maximum values. The domain management component 210 can then provide this information to the generation component 220 to enable generation of keys thereby. This can be accomplished by continually incrementing a value, by an increment value, based on the seed. Upon reaching a maximum value, the generation component 210 can request an additional quantity of values to enable generation of more keys where the original amount is not sufficient. If all values requested and designated for use are not used by the generation component 220, the domain management component 210 can return the values to the domain thereby making them available for subsequent employment.

Figure 3:
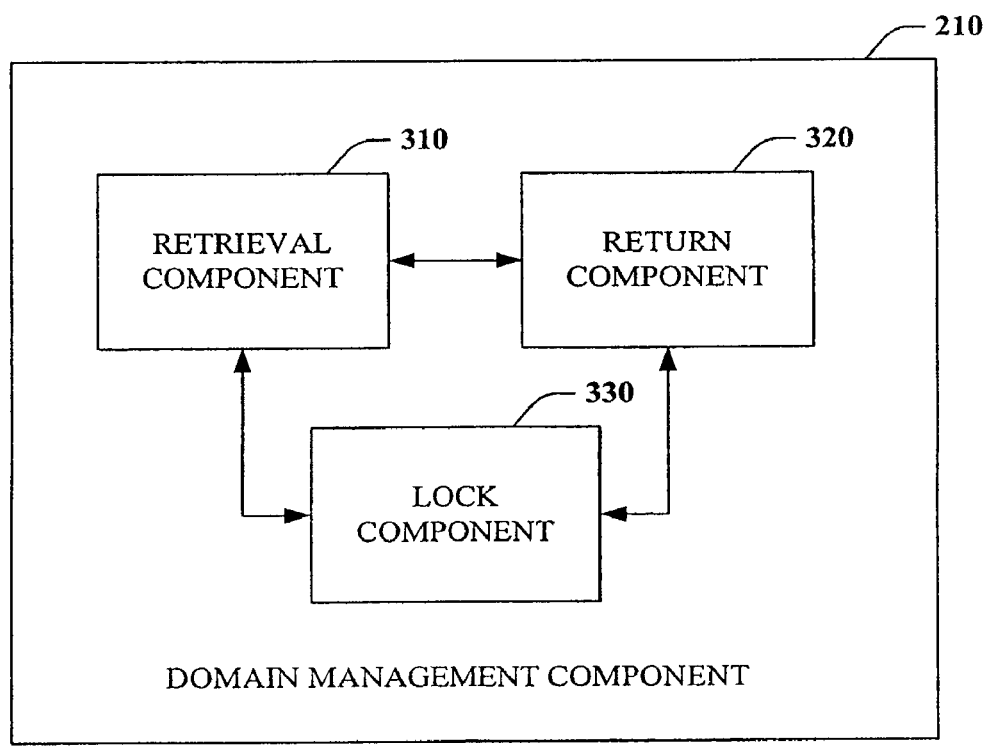
FIG. 3 is a block diagram of a domain management component.

FIG. 3 depicts a domain management component 210 in further detail in accordance with an aspect of the subject innovation. Management component 210 includes a retrieval component 310 that includes logic and mechanisms to facilitate transmission, receipt and/or retrieval of data relating to identification of available values that can be employed with respect to generation of keys. By way of example, the data can include a request for a quantity of values as well as information such as starting and increment values. The domain management component 210 also includes a return component 320. The return component 320 includes logic and mechanisms to aid returning unused values to the domain. In particular, the domain component can be contacted and a determination made as to whether any additional groups of values have been set as unavailable due to interaction from others. If not, the unused values can be returned to the domain. This can correspond to resetting the state of the returned values as available for use. Both the retrieval component 310 and return component 320 are communicatively coupled to the lock component 330. To enable parallel key generation and transaction isolation, the locking component 330 can be employed to acquire a lock to prevent more than one entity from accessing the domain at the same time. Thus, when the retrieval component 310 or return component 320 seek to communicate with the domain they can first signal the lock component 330 to lock the domain. Upon completion of communication with the domain, lock component 330 can remove the lock so as to allow other entities or components to interact with the domain.

Figure 4:
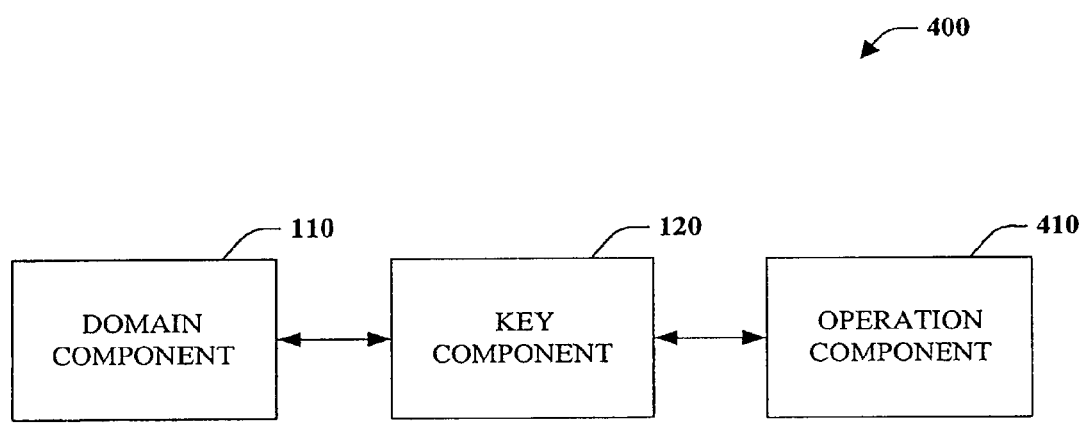
FIG. 4 is a block diagram of a key interaction system.

FIG. 4 illustrates a key interaction system 400. System 400 includes domain component 110 and key component 120. As previously described, the domain component 110 can maintain and/or provide information pertaining to a domain of values and the state thereof. The key component 120 can interact with the domain component 110 to facilitate generation of keys from the domain. The operation component 410 corresponds to an operation that requires knowledge of a plurality of keys. For example, the operation can correspond to a join operation or the like employed with respect to loading a database or data warehouse. Conventionally what is done is a record is added to a database table and the database system subsequently provides the value it assigned to that record. However, this does not enable single pass operation, as there is no way of knowing a key in advance. Furthermore, this system is not conducive to use by multiple users.

Key interaction system 400 solves the aforementioned and other problems. In particular, a group of values can be requested in advance via key component 120 to allow operations component 410 to execute operations utilizing the keys. Generation of keys by key component 120 has an added benefit of relieving a database of this burden as the key component 120 can form part of an external client service (e.g., data transformation, workflow . . . ). Furthermore, a variable number of values can be retrieved to use in key generation rather than always utilizing a default, although this is also possible. Additionally, any values that are not used to generate keys can be returned to the domain so that such values are not lost and/or unusable. Still further yet, transactional locking and unlocking of the domain is provided to enable multiple users to interact with the domain.

Figure 5:
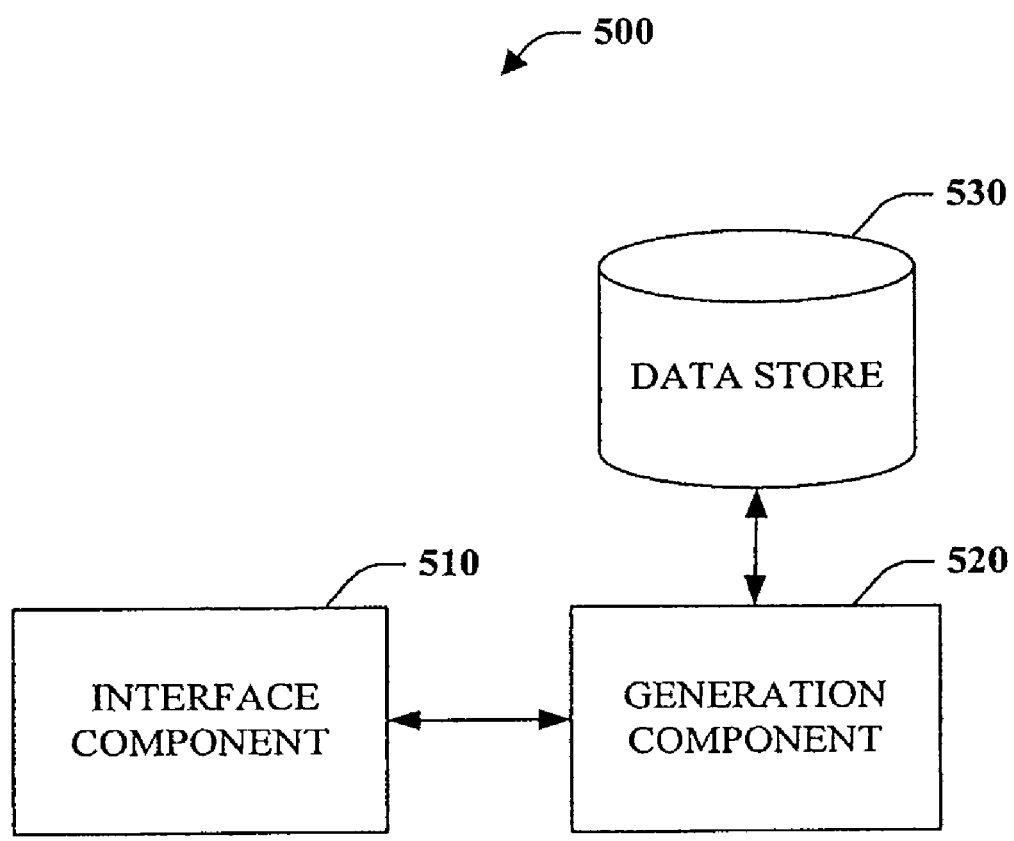
FIG. 5 is a block diagram of domain component generation system.

Turning to FIG. 5 a domain component generation system 500 is depicted in accordance with an aspect of the subject innovation. The system 500 includes a user interface component 510. The user interface component 510 receives and provides information from and to a user. In one instance, the interface component 510 can be graphical and/or text based. For instance, the interface component 510 can correspond to a graphical user interface or a series of interfaces as provided by a wizard that queries and receives information from a user sequentially. The user interface component 510 is communicatively coupled to the generation component 520. The generation component 520 produces a domain component that is indicative of the state of the domain in accordance with information provided by the user interface component 520. The domain component can be created and persisted in a data store 530. In accordance with an aspect of the innovation, a user can select a database in which to create a domain table or select an existing database and domain table. Furthermore, a user can create a named domain within a created or selected table within a store. In particular, a row in a table can be populated with domain name, an optional description, a creator name, a created date and an increment, current seed, and key cache or group values. Of course, the user can provide all or a portion of these values via user interface component 510 while those not specifically supplied can be set to default values.

The aforementioned systems have been described with respect to interaction between several components. It should be appreciated that such systems and components can include those components or sub-components specified therein, some of the specified components or sub-components, and/or additional components. Sub-components could also be implemented as components communicatively coupled to other components rather than included within parent components. Further yet, one or more components and/or sub-components may be combined into a single component providing aggregate functionality. The components may also interact with one or more other components not specifically described herein for the sake of brevity, but known by those of skill in the art.

Furthermore, as will be appreciated, various portions of the disclosed systems above and methods below may include or consist of artificial intelligence, machine learning, or knowledge or rule based components, sub-components, processes, means, methodologies, or mechanisms (e.g., support vector machines, neural networks, expert systems, Bayesian belief networks, fuzzy logic, data fusion engines, classifiers . . . ). Such components, inter alia, can automate certain mechanisms or processes performed thereby to make portions of the systems and methods more adaptive as well as efficient and intelligent. By way of example and not limitation, generation component 520 of FIG. 5 can employ machine learning to facilitate automatically generating domain components based on past interactions and/or can infer values of unspecified domain values.

In view of the exemplary systems described supra, methodologies that may be implemented in accordance with the disclosed subject matter will be better appreciated with reference to the flow charts of FIGS. 6-11. While for purposes of simplicity of explanation, the methodologies are shown and described as a series of blocks, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methodologies described hereinafter.

Additionally, it should be further appreciated that the methodologies disclosed hereinafter and throughout this specification are capable of being stored on an article of manufacture to facilitate transporting and transferring such methodologies to computers. The term article of manufacture, as used herein, is intended to encompass a computer program accessible from any computer-readable device, carrier, or media.

Figure 6:
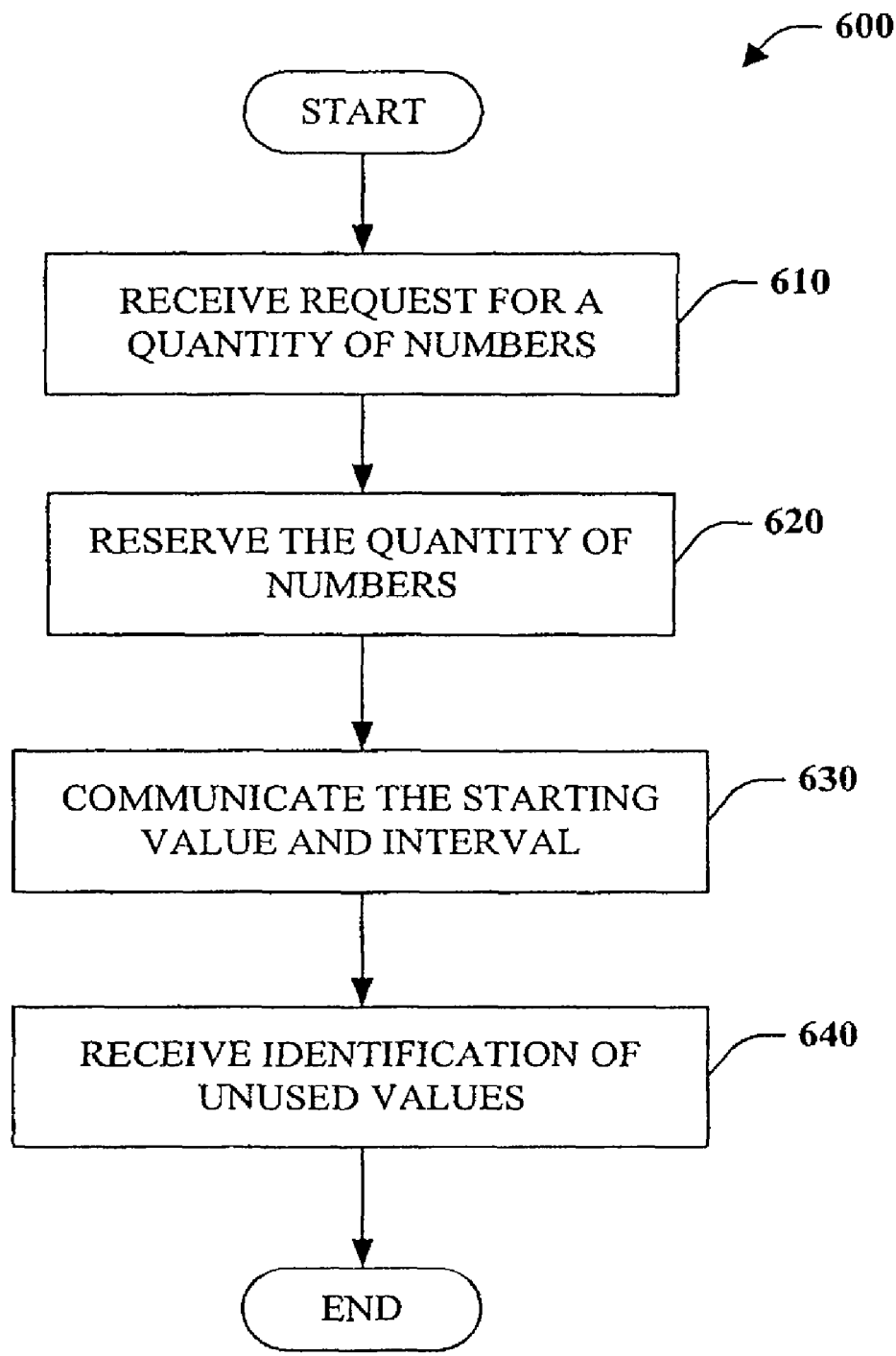
FIG. 6 is a flow chart diagram of a domain management methodology.

Turning to FIG. 6, a domain management methodology 600 is depicted in accordance with an aspect of the subject innovation. A domain can consist of a finite number of unique values. These values can be utilized as keys such as surrogate keys. At reference numeral 610, a request is received for a number of values. At numeral 620, the requested number of values is reserved. In other words, a sequence of values can be identified as used and unavailable such that subsequent requests for values will not receive reserved values. At 630, the starting value as well as an interval, among other data, is communicated, for instance to a requesting entity. At reference numeral 640, identification of one or more unused values is received and/or noted. For instance, if a thousand values are reserved for an entity and only ten are utilized for keys then the remaining nine-hundred and ninety would be lost. However, in accordance with an aspect of the subject innovation these values can be returned to the domain and noted such that these values can be reserved for use by another entity, for example.

Figure 7:
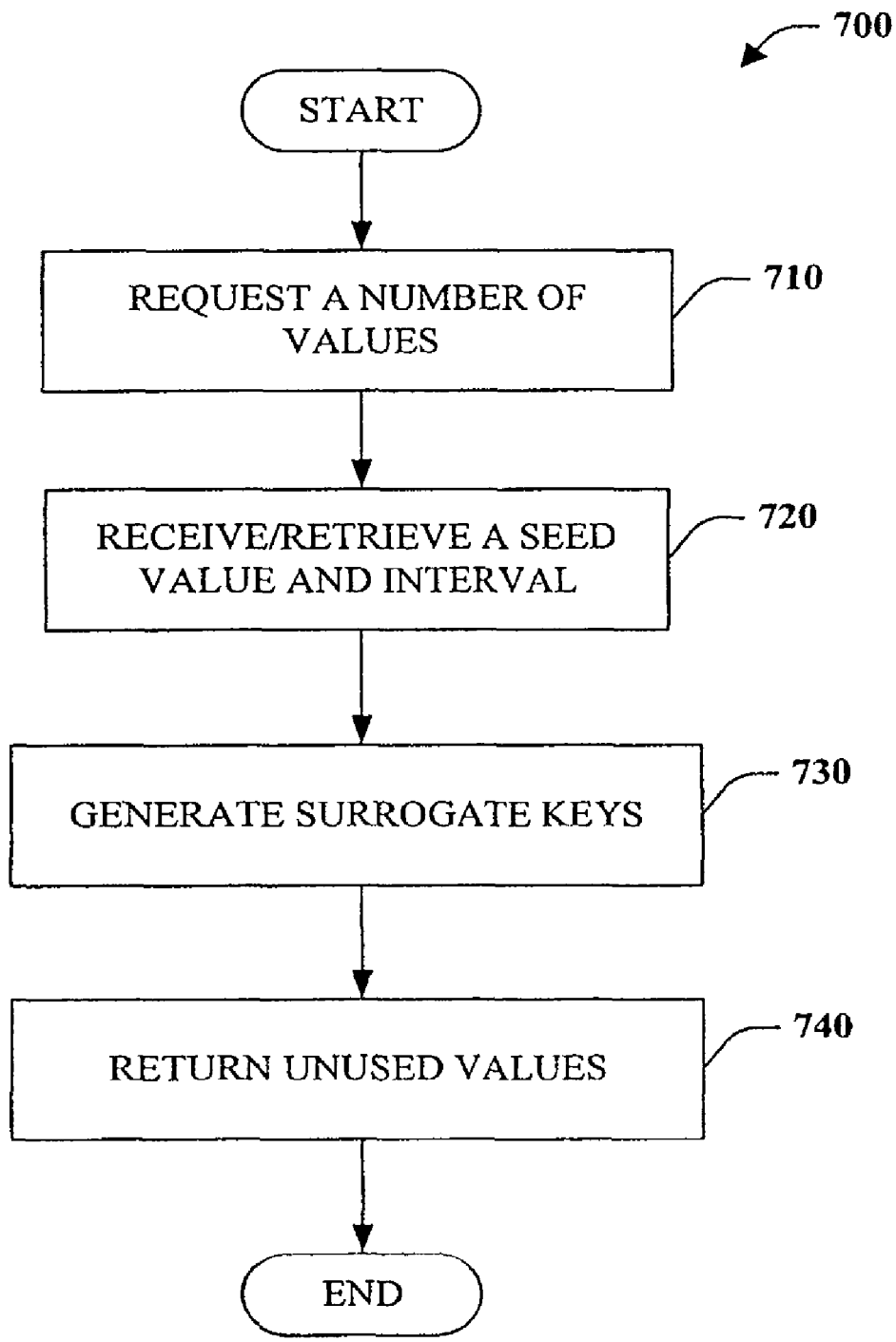
FIG. 7 is a flow chart diagram of a domain interaction methodology.

FIG. 7 illustrates a flow chart diagram of a domain interaction methodology 700. At reference numeral 710, a request is made for a number or cache of values. These values can be unique values such as integers and the request can be made to a domain component, which can be a database object, for instance. In response to the request of 710, a start or seed value and an interval can be received or alternatively retrieved at 720. At reference numeral 730, keys or more specifically surrogate keys can be generated based on the seed value, the interval and/or additional information. In one instance, a value can simply correspond to a key. At numeral 740, unused values are returned. For example, if a sequence from one to a thousand was requested and only ten values utilized, then the remaining vales can be returned and made available for use by another entity, for instance. The manner in which such values are returned can vary but in one exemplary implementation, the domain can be provided with the first value and optionally the last value of a sequence of unused values.

Figure 8:
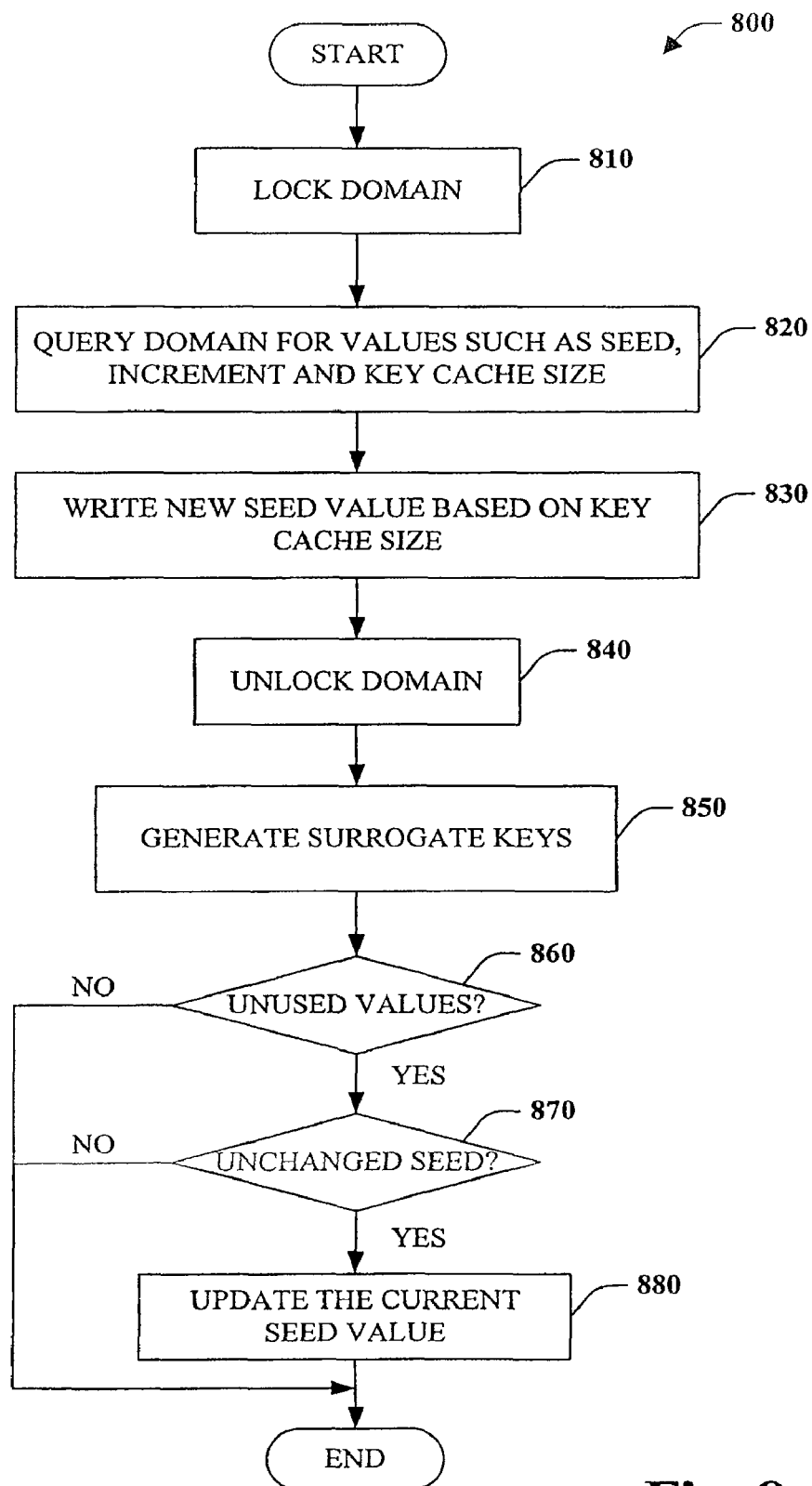
FIG. 8 is a flow chart diagram of a method of interacting with a domain.

Turning to FIG. 8, a method 800 of interacting with a domain is illustrated in accordance with an aspect of the subject innovation. At reference numeral 810, the domain is locked. This ensures that only one entity can interact with the domain at the same time, thereby facilitating domain sharing as well as isolation. At numeral 820, the domain is queried for values and state information such as start value or seed, increment and key cache size where default size is utilized. The seed value indicates the start of a sequence of a plurality of values separated by the increment. The key cache size denotes the number of values in the sequence. At 830, a new seed value is written to the domain based on the key cache size. For example, if the seed is 1 and the key cache size is 100, then the new seed written is 101, representing the next available value. The domain is unlocked at 840, allowing other entities or processes to access the domain in its current state. At reference numeral 850, keys are generated based on the values requested and allocated to the process from the domain. As will be appreciated, the domain can simply be a database object and the actions or behaviors are provided external to the database thereby relieving the database of this burden. At numeral 860, a determination is made as to whether all the values requested and or allocated have been utilized. If there are no unused values, the method can simply terminate. However, if unused values do exist then method proceeds to 870. At 870, a determination is made as to whether the seed changed from the one previously written for instance at act 830. If the seed has changed, then the method will be allowed to terminate. This can correspond to a scenario in which a second entity requests a sequence of values after a first entity and before the first entity performs the check at 870. Since, sequences are being employed values may not be returned after later values are allocated to another entity in accordance with a particular aspect of the innovation. For example, consider a sequence that starts at one and increments by one. User A requests and receives a cache of a thousand values, namely 1 to one 1001. However, user A only makes use of a hundred values from 1 to a 101. User B requests and receives a cache of a thousand values from 1002 to 2003. The values between 102 and 1001 are lost. If the seed has not changed then no intervening values were allocated and the method can continue at 880. At reference numeral 880, the current seed value in the domain can be updated or rolled back to the first value that has not be used. Continuing with the previous example, if user B does not request and receive an allocation of values, then the seed can be updated to be 102. Subsequent, requests for values would then start at 102 and no values are lost.

Figure 9:
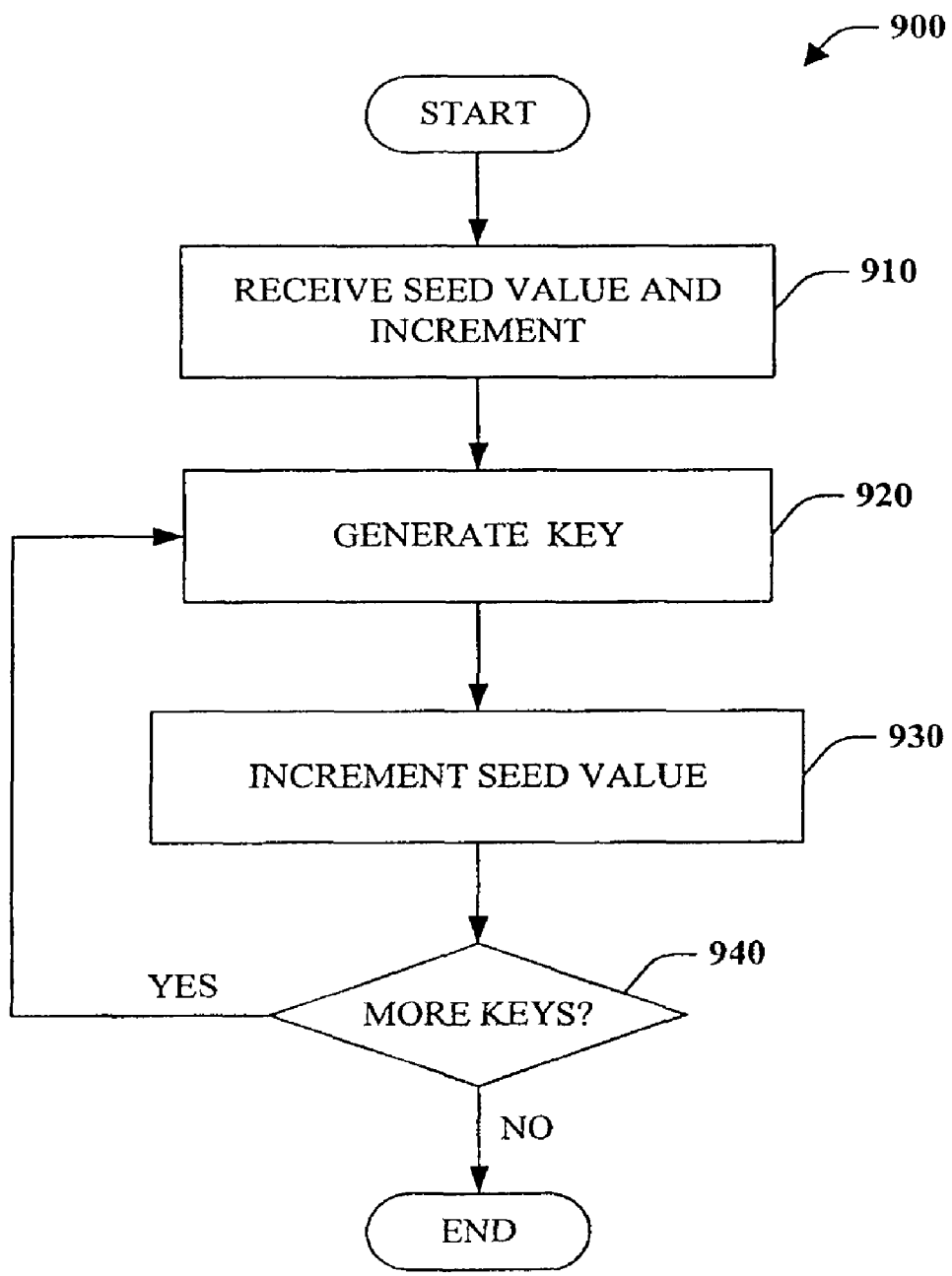
FIG. 9 is a flow chart diagram of a method of generating keys.

FIG. 9 illustrates a method 900 of generating keys such as surrogate keys in accordance with an aspect of the subject innovation. At reference 910 a seed or start value and optionally an increment value is received or retrieved. For example, a domain component can be queried to retrieve the current seed and the increment value. It should be appreciated that the increment value can be set to one by default. At numeral 920, a key is generated. In particular key generation can be as simple as utilizing a value or a more complex calculation. During the first run or iteration, the current value is equal to the seed. Hence, the first key can be set equal to the seed value. At 930, the current value is incremented by the increment value such as one. At reference numeral 940, a check is made concerning whether there are more keys that are to be generated. If there are not more keys to be generated the method ends. If, however, there are more keys to be generated method 900 can proceed to 920 where a key is generated, for instances by setting the key equal to the current value. It should also be noted that a check could be added to method 900 to determine whether a maximum value as been reached. The maximum value can correspond to the highest value in a requested series of allocated values. If yes, then the method needs to retrieve additional values from the domain. If not, the method can proceed as normal.

Figure 10:
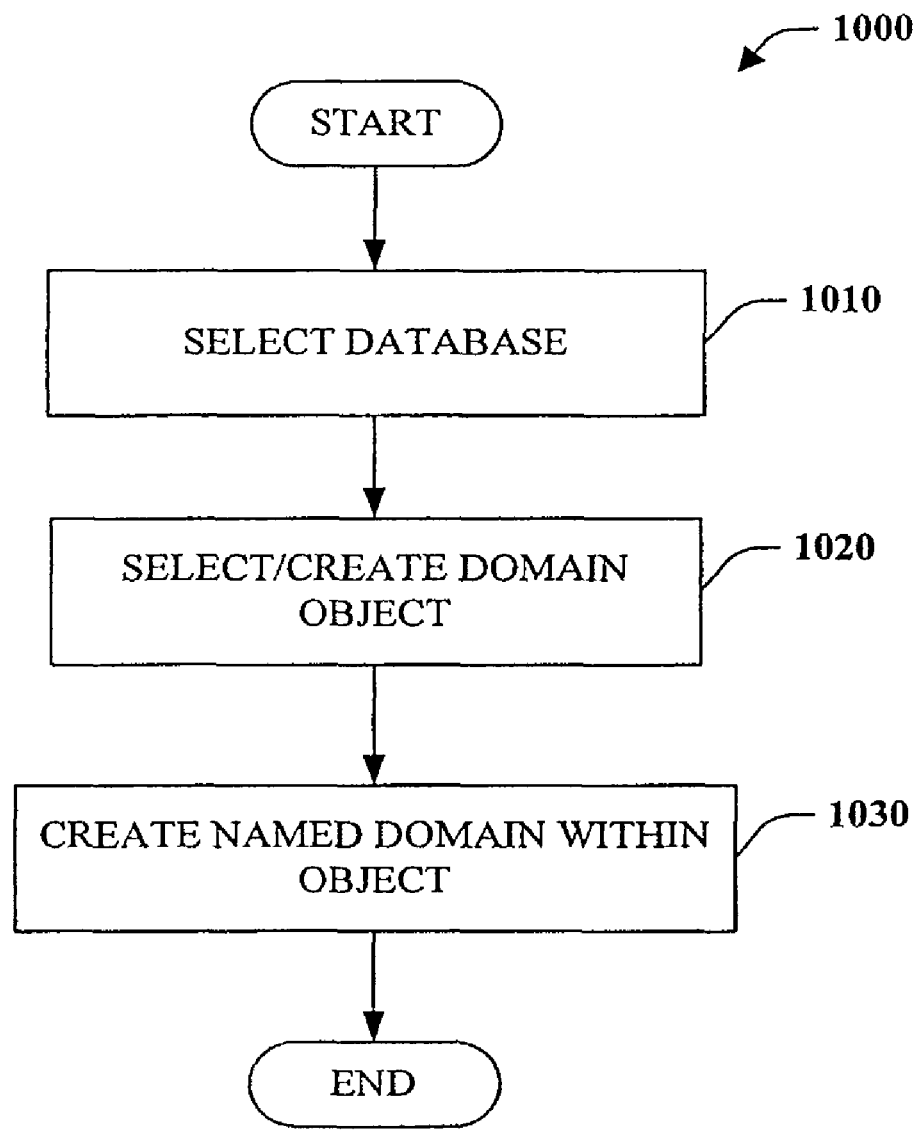
FIG. 10 is a flow chart diagram of a domain component generation methodology.

FIG. 10 illustrates a domain component generation methodology 1000 in accordance with an aspect of the claimed innovation. As described supra, a domain component can define the state of a domain, whereas a key component can defined the behavior of the domain. At reference numeral 1010, a database is selected. At 1020, a domain object such as a table is selected within an existing database or created in a new database. At numeral 1030, a domain is created within the domain object. For instance, a row in table can be populated with a domain name, an optional description, a creator name, a created date, and increment, current seed, and key cache values. Those values not specifically specified can be populated with default values or otherwise determined or inferred.

A table representing a database object can include the following exemplary structure:

```
[DomainName] [nchar](50) NOT NULL
[Description] [nchar](200) NULL,
[Creator] [nchar](50) CONSTRAINT
[DF_SSISKeyDomains_Creator] DEFAULT
(user_name( )),
[Created] [timestamp] NOT NULL,
[Increment] [int] NOT NULL CONSTRAINT
[DF_SSISKeyDomains_Increment]
DEFAULT ((1)),
[CurrentSeed] [int] NOT NULL CONSTRAINT
[DF_SSISKeyDomains_CurrentSeed]
DEFAULT ((1)),
[KeyCacheSize] [int] NOT NULL CONSTRAINT
[DF_SSISKeyDomains_KeyCacheSize] DEFAULT ((1000)),
CONSTRAINT [PK_SSISKeyDomains] PRIMARY KEY CLUSTERED
([DomainName] ASC) )
```

This is similar to a sequence object in that it includes an increment, start value (current seed) and a cache size. However, the domain object differs from a sequence object at least because the domain object can be employed solely to define the state of domain. However, the subject innovation is not so limited.

Figure 11:
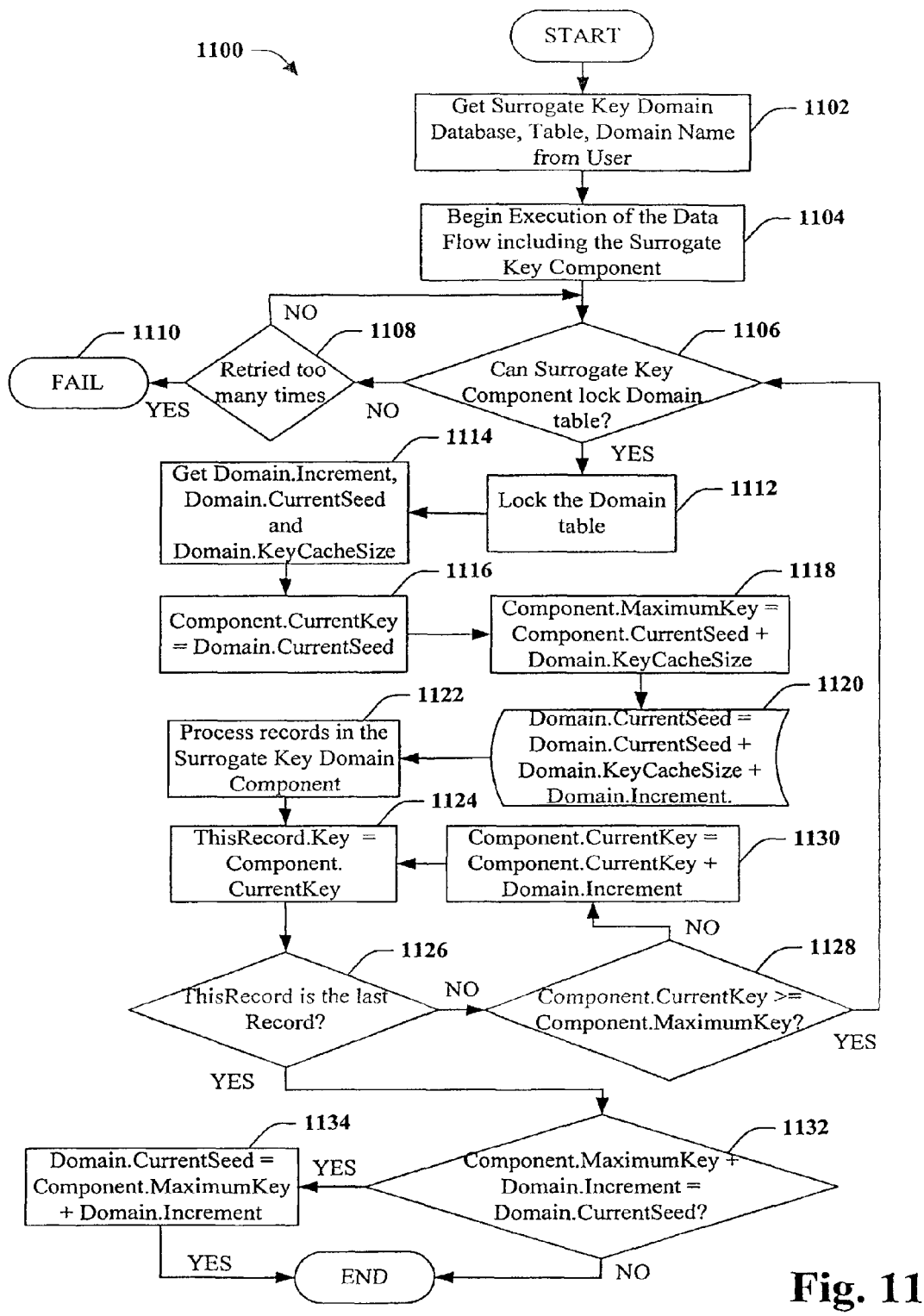
FIG. 11 is a flow chart diagram an exemplary record insertion methodology.

FIG. 11 is a flow chart diagram illustrating an exemplary record insertion methodology 1100 to facilitate clarity and understanding of aspects of the subject innovation. At reference numeral 1102, a surrogate key domain database, table, and domain name are obtained from a user at design time, for instance. At 1104, execution of a data flow including the surrogate key component begins. At reference 1106, a determination is made as to whether the key component is able to lock the domain table. If no, the method continues to 1108 where a decision is made concerning whether the method retried too many times with respect to obtaining a lock. If yes, the method fails at 1110. If no, the method loops back to 1106 where the determination concerns whether a lock can be obtained. If a lock can be obtained at 1106, then the method proceeds to 1112. At reference numeral 1112, the domain table is locked. The domain is locked to, among other things, prevent other parallel processes from changing values. The method continues with act 1114, where a domain increment, current seed and key cache size are obtained. At numeral 1116, the current key is set to the current seed—the first key from which to start incrementing. The maximum key is set to the current seed plus the cache size at 1118. At 1120, the domain current seed is set equal to the current seed plus the cache size plus the increment. This ensures that the next request to use this domain will receive a range of values that does not clash with the current component's range. At reference numeral 1122, records in the key domain are processed. In particular, surrogate keys are generated. A record key, at 1124, is set equal to the current key. At 1126, a determination is made as to whether this record is the last record. If no, then the method continues to 1128 where the current key is compared with the maximum key. If the current key is greater than or equal to the maximum key, then more cached keys need to be acquired. In accordance therewith, the method can proceed to 1106, where the domain is locked and additional values acquired. If the current key value is less than the maximum key then the method continues at 1130. At 1130, a new current key is assigned the value of the previous current key plus the domain increment. The method then proceeds to 1124 where the record key is assigned the value of the current key. Records are therefore passed out of the component complete with a new key for each record. The method can continue to 1132 where the current record is the last record. At 1132, a determination is made as to whether the maximum key plus the domain increment is equal to the domain current seed. If no, the method can simply be allowed to terminate. If yes, then the domain current seed is given the value of the maximum key plus the domain increment. Subsequently, the method ends.

There are several advantages associated with the above exemplary methodology. First, the surrogate key is available before inserting the record into the database. Second, the locking and updating mechanisms ensures that key generation is highly parallel without conflicts or confusion. Third, unused keys are given back. When the key component has seen the last record being passed to it, it may have some potential keys still remaining. In other words, the current value of the incrementing key at the end of the process is less than the maximum key value calculated. In this event, the component queries the domain object to find the current seed value. If the current seed value is unchanged from the value previously set, then it is known that no parallel process has requested additional keys—in this case, the component increments the current value of the key in the component and writes it back to the domain objected as a new current seed value.

Figure 12:
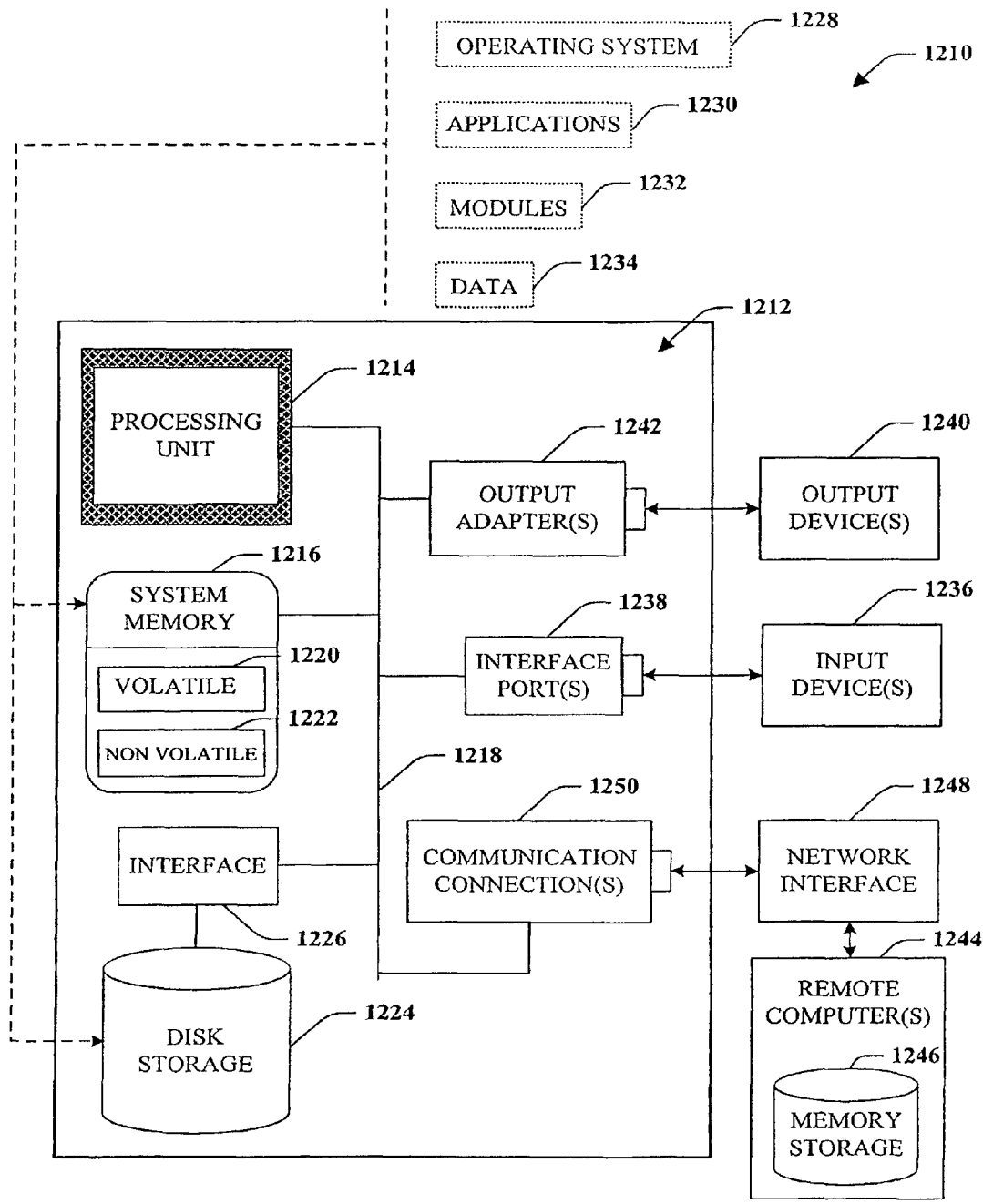
FIG. 12 is a schematic block diagram illustrating a suitable operating environment for aspects of the subject innovation.
Figure 13:
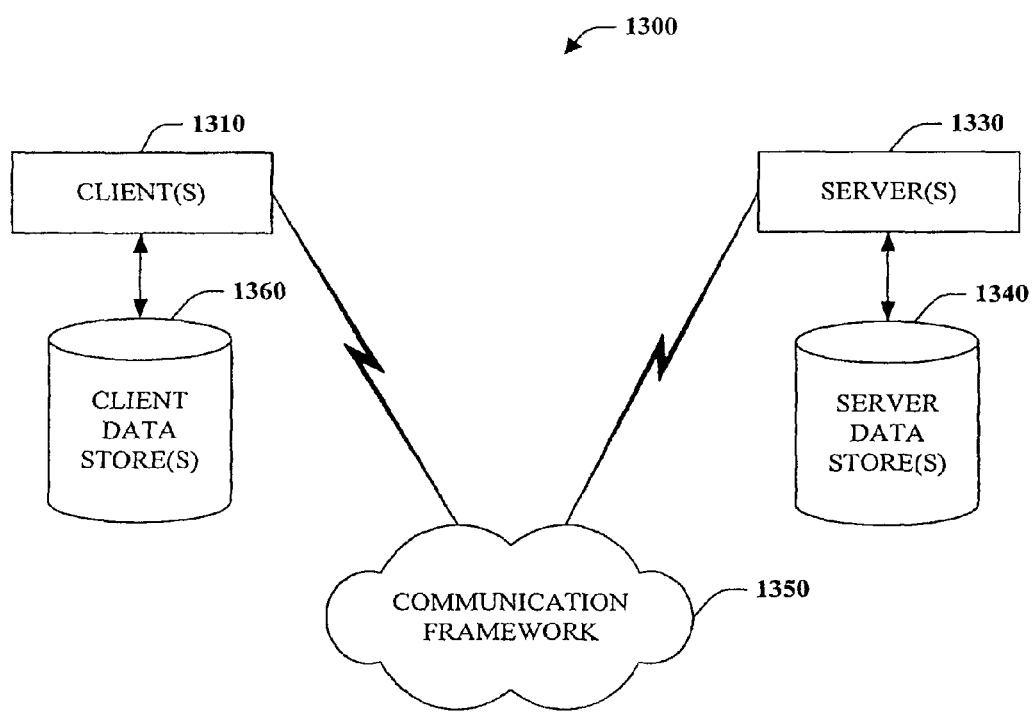
FIG. 13 is a schematic block diagram of a sample-computing environment.

In order to provide a context for the various aspects of the disclosed subject matter, FIGS. 12 and 13 as well as the following discussion are intended to provide a brief, general description of a suitable environment in which the various aspects of the disclosed subject matter may be implemented. While the subject matter has been described above in the general context of computer-executable instructions of a computer program that runs on a computer and/or computers, those skilled in the art will recognize that the subject innovation also may be implemented in combination with other program modules. Generally, program modules include routines, programs, components, data structures, etc. that perform particular tasks and/or implement particular abstract data types. Moreover, those skilled in the art will appreciate that the inventive methods may be practiced with other computer system configurations, including single-processor or multiprocessor computer systems, mini-computing devices, mainframe computers, as well as personal computers, hand-held computing devices (e.g., personal digital assistant (PDA), phone, watch ... ), microprocessor-based or programmable consumer or industrial electronics, and the like. The illustrated aspects may also be practiced in distributed computing environments where tasks are performed by remote processing devices that are linked through a communications network. However, some, if not all aspects of the claimed innovation can be practiced on stand-alone computers. In a distributed computing environment, program modules may be located in both local and remote memory storage devices.

With reference to FIG. 12, an exemplary environment 1210 for implementing various aspects disclosed herein includes a computer 1212 (e.g., desktop, laptop, server, hand held, programmable consumer or industrial electronics . . . ). The computer 1212 includes a processing unit 1214, a system memory 1216, and a system bus 1218. The system bus 1218 couples system components including, but not limited to, the system memory 1216 to the processing unit 1214. The processing unit 1214 can be any of various available microprocessors. Dual microprocessors and other multiprocessor architectures also can be employed as the processing unit 1214.

The system bus 1218 can be any of several types of bus structure(s) including the memory bus or memory controller, a peripheral bus or external bus, and/or a local bus using any variety of available bus architectures including, but not limited to, 11-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCMCIA), and Small Computer Systems Interface (SCSI).

The system memory 1216 includes volatile memory 1220 and nonvolatile memory 1222. The basic input/output system (BIOS), containing the basic routines to transfer information between elements within the computer 1212, such as during start-up, is stored in nonvolatile memory 1222. By way of illustration, and not limitation, nonvolatile memory 1222 can include read only memory (ROM), programmable ROM (PROM), electrically programmable ROM (EPROM), electrically erasable ROM (EEPROM), or flash memory. Volatile memory 1220 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 1212 also includes removable/non-removable, volatile/non-volatile computer storage media. FIG. 12 illustrates, for example, disk storage 1224. Disk storage 1224 includes, but is not limited to, devices like a magnetic disk drive, floppy disk drive, tape drive, Jaz drive, Zip drive, LS-100 drive, flash memory card, or memory stick. In addition, disk storage 1224 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1224 to the system bus 1218, a removable or non-removable interface is typically used such as interface 1226.

It is to be appreciated that FIG. 12 describes software that acts as an intermediary between users and the basic computer resources described in suitable operating environment 1210. Such software includes an operating system 1228. Operating system 1228, which can be stored on disk storage 1224, acts to control and allocate resources of the computer system 1212. System applications 1230 take advantage of the management of resources by operating system 1228 through program modules 1232 and program data 1234 stored either in system memory 1216 or on disk storage 1224. It is to be appreciated that the present invention can be implemented with various operating systems or combinations of operating systems.

A user enters commands or information into the computer 1212 through input device(s) 1236. Input devices 1236 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1214 through the system bus 1218 via interface port(s) 1238. Interface port(s) 1238 include, for example, a serial port, a parallel port, a game port, and a universal serial bus (USB). Output device(s) 1240 use some of the same type of ports as input device(s) 1236. Thus, for example, a USB port may be used to provide input to computer 1212 and to output information from computer 1212 to an output device 1240. Output adapter 1242 is provided to illustrate that there are some output devices 1240 like displays (e.g., flat panel and CRT), speakers, and printers, among other output devices 1240 that require special adapters. The output adapters 1242 include, by way of illustration and not limitation, video and sound cards that provide a means of connection between the output device 1240 and the system bus 1218. It should be noted that other devices and/or systems of devices provide both input and output capabilities such as remote computer(s) 1244.

Computer 1212 can operate in a networked environment using logical connections to one or more remote computers, such as remote computer(s) 1244. The remote computer(s) 1244 can be a personal computer, a server, a router, a network PC, a workstation, a microprocessor based appliance, a peer device or other common network node and the like, and typically includes many or all of the elements described relative to computer 1212. For purposes of brevity, only a memory storage device 1246 is illustrated with remote computer(s) 1244. Remote computer(s) 1244 is logically connected to computer 1212 through a network interface 1248 and then physically connected via communication connection 1250. Network interface 1248 encompasses communication networks such as local-area networks (LAN) and wide-area networks (WAN). LAN technologies include Fiber Distributed Data Interface (FDDI), Copper Distributed Data Interface (CDDI), Ethernet/IEEE 802.3, Token Ring/IEEE 802.5 and the like. WAN technologies include, but are not limited to, point-to-point links, circuit-switching networks like Integrated Services Digital Networks (ISDN) and variations thereon, packet switching networks, and Digital Subscriber Lines (DSL).

Communication connection(s) 1250 refers to the hardware/software employed to connect the network interface 1248 to the bus 1218. While communication connection 1250 is shown for illustrative clarity inside computer 1216, it can also be external to computer 1212. The hardware/software necessary for connection to the network interface 1248 includes, for exemplary purposes only, internal and external technologies such as, modems including regular telephone grade modems, cable modems, power modems and DSL modems, ISDN adapters, and Ethernet cards or components.

FIG. 13 is a schematic block diagram of a sample-computing environment 1300 with which the subject innovation can interact. The system 1300 includes one or more client(s) 1310. The client(s) 1310 can be hardware and/or software (e.g., threads, processes, computing devices). The system 1300 also includes one or more server(s) 1330. Thus, system 1300 can correspond to a two-tier client server model or a multi-tier model (e.g., client, middle tier server, data server), amongst other models. The server(s) 1330 can also be hardware and/or software (e.g., threads, processes, computing devices). The servers 1330 can house threads to perform transformations by employing the subject innovation, for example. One possible communication between a client 1310 and a server 1330 may be in the form of a data packet transmitted between two or more computer processes.

The system 1300 includes a communication framework 1350 that can be employed to facilitate communications between the client(s) 1310 and the server(s) 1330. The client(s) 1310 are operatively connected to one or more client data store(s) 1360 that can be employed to store information local to the client(s) 1310. Similarly, the server(s) 1330 are operatively connected to one or more server data store(s) 1340 that can be employed to store information local to the servers 1330.

What has been described above includes examples of aspects of the claimed subject matter. It is, of course, not possible to describe every conceivable combination of components or methodologies for purposes of describing the claimed subject matter, but one of ordinary skill in the art may recognize that many further combinations and permutations of the disclosed subject matter are possible. Accordingly, the disclosed subject matter is intended to embrace all such alterations, modifications and variations that fall within the spirit and scope of the appended claims. Furthermore, to the extent that the terms "includes," "has" or "having" or variations thereof are used in either the detailed description or the claims, such terms are intended to be inclusive in a manner similar to the term "comprising" as "comprising" is interpreted when employed as a transitional word in a claim.

What is claimed is:

1. A computing system comprising:
   a processor; and
   one or more storage medium storing computer-executable instructions which, when executed by the computing system, implement a method performed by at least a surrogate key domain component that is executed by processor for generating surrogate keys using a surrogate key domain table that is stored in a database, wherein the method comprises:
   sending a first request to the surrogate key domain table for a first quantity of surrogate key values;
   in response to the request, acquiring a lock on the surrogate key domain table, the surrogate key domain table comprising a database object in the database, the surrogate key domain table including values representing an increment, a current seed, and a cache size to be used by the surrogate key domain component to generate surrogate keys to assign to records that are to be inserted into the database;
   upon acquiring the lock on the surrogate key domain table, querying the surrogate key domain table for the increment, the current seed, and the cache size;
   receiving an identity of a first starting value as identified by the current seed;
   reserving a first sequence of the first quantity of surrogate key values by performing the following:
   assigning the current seed to a current key of the surrogate key domain component, the current key representing a current value to be used for the next surrogate key generated by the surrogate key domain component;
   determining a maximum value for the current key based on the first starting value of the current seed and the cache size;
   writing a new value to the current seed of the surrogate key domain table, the new value being the sum of the current seed, the cache size, and the increment;
   and wherein the method further comprises:
   for each particular record of a set of records to be inserted into the database, performing the following:
   creating a record key, which comprises one of the generated surrogate keys, for the particular record and that is equal to the new value of the current key;
   incrementing the new value of the current key by the increment; and
   inserting the particular record into the database;
   thereafter, determining whether the new value of the current key is less than the maximum value;
   upon determining that the new value of the current key is less than the maximum value, querying the surrogate key domain table for the current value of the current seed;
   comparing the current value of the current seed to the new value that was written to the current seed previously to determine whether another process has obtained the increment, the current seed, and the cache size from the surrogate key domain table since the surrogate key domain component obtained the increment, the current seed, and the cache size; and
   upon determining that the current value of the current seed is the same as the new value, writing the current value of the current key to the current seed thus allowing any unused values from the first quantity of surrogate key values to be subsequently used as surrogate keys.

2. The computing system of claim 1, wherein the surrogate key domain table further includes values representing a domain name and a description.

3. The computing system of claim 1, wherein the method further comprises:
   creating the surrogate key domain table in the database by specifying a domain name, a description of the domain, a creator name, and a creation date.

4. The computing system of claim 3, wherein the surrogate key domain table is created by populating a row in a table of the database with the domain name, the description of the domain, the creator name, and the creation date.

5. The computing system of claim 1, wherein the method further comprises:
   determining that the current value of the current seed is different than the new value; and
   refraining from writing the current value of the current key to the current seed.

6. The computing system of claim 1, wherein the surrogate key domain component is external to the database.

7. The computing system of claim 6, wherein the surrogate key domain component is an external client service.

8. The computing system of claim 1, wherein the one or more storage medium comprise system memory of the computing system.

9. The computing system of claim 8, wherein the database is stored on the system memory.

10. The computing system of claim 8, wherein the surrogate key domain component is stored on the system memory.

* * * * *